United States Patent
Bergholz et al.

(10) Patent No.: US 9,777,635 B2
(45) Date of Patent: Oct. 3, 2017

(54) ENGINE COMPONENT

(71) Applicant: General Electric Company, Schenectady, NY (US)

(72) Inventors: Robert Frederick Bergholz, Loveland, OH (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 14/587,534

(22) Filed: Dec. 31, 2014

(65) Prior Publication Data

US 2016/0186660 A1 Jun. 30, 2016

(51) Int. Cl.
*F02C 7/18* (2006.01)
*F01D 5/18* (2006.01)
*F23R 3/16* (2006.01)

(52) U.S. Cl.
CPC .................. *F02C 7/18* (2013.01); *F01D 5/18* (2013.01); *F01D 5/187* (2013.01); *F23R 3/16* (2013.01); *F05D 2250/20* (2013.01); *F05D 2260/2212* (2013.01); *F05D 2260/22141* (2013.01); *Y02T 50/672* (2013.01); *Y02T 50/673* (2013.01); *Y02T 50/676* (2013.01)

(58) Field of Classification Search
CPC .... F01D 5/18; F01D 5/187; F02C 7/17; F23R 3/16; F05D 2250/20; F05D 2260/2212; F05D 2260/22141; Y02T 50/672; Y02T 50/673; Y02T 50/676
See application file for complete search history.

(56) References Cited

U.S. PATENT DOCUMENTS

| | | | |
|---|---|---|---|
| 4,786,233 A | * | 11/1988 | Shizuya ................. F01D 5/187 416/90 R |
| 5,201,847 A | | 4/1993 | Whidden |
| 5,513,982 A | | 5/1996 | Althaus et al. |
| 5,700,132 A | * | 12/1997 | Lampes ................ F01D 5/187 415/115 |
| 5,738,493 A | | 4/1998 | Lee et al. |
| 5,797,726 A | * | 8/1998 | Lee ........................ F01D 5/187 416/96 R |
| 6,089,826 A | | 7/2000 | Tomita et al. |

(Continued)

FOREIGN PATENT DOCUMENTS

| DE | 102004045923 A1 | 5/2005 |
|---|---|---|
| EP | 1914390 A2 | 4/2008 |

(Continued)

OTHER PUBLICATIONS

European Search Report and Opinion issued in connection with corresponding EP Application No. 15201159.9 dated May 3, 2016.

(Continued)

*Primary Examiner* — Igor Kershteyn
(74) *Attorney, Agent, or Firm* — General Electric Company; William Scott Andes

(57) ABSTRACT

An engine component includes a hot surface in thermal communication with a hot combustion gas flow, and a cooling surface, opposite the hot surface, along which a cooling fluid flows. At least one vortex generator is provided on the cooling surface, and can induce a vortex in the cooling fluid in response to contact with the flowing cooling fluid.

12 Claims, 11 Drawing Sheets

(56) References Cited

U.S. PATENT DOCUMENTS

| | | | |
|---|---|---|---|
| 6,227,804 B1* | 5/2001 | Koga | F01D 5/187 |
| | | | 415/115 |
| 6,890,154 B2* | 5/2005 | Cunha | F01D 5/187 |
| | | | 415/115 |
| 7,094,031 B2* | 8/2006 | Lee | F01D 5/187 |
| | | | 416/97 R |
| 7,637,720 B1 | 12/2009 | Liang | |
| 7,980,818 B2 | 7/2011 | Kizuka et al. | |
| 8,167,560 B2 | 5/2012 | Liang | |
| 2004/0219016 A1 | 11/2004 | Demers et al. | |
| 2007/0107882 A1* | 5/2007 | Geskes | F28F 1/40 |
| | | | 165/109.1 |
| 2008/0019840 A1 | 1/2008 | Cunha | |
| 2008/0089787 A1* | 4/2008 | Abdel-Messeh | F01D 5/187 |
| | | | 416/179 |
| 2009/0145581 A1 | 6/2009 | Hoffman et al. | |
| 2010/0119372 A1 | 5/2010 | Gage et al. | |
| 2010/0223931 A1* | 9/2010 | Chila | F23R 3/005 |
| | | | 60/760 |
| 2011/0095135 A1* | 4/2011 | Miller | B64C 23/06 |
| | | | 244/200.1 |
| 2013/0089434 A1 | 4/2013 | Simpson et al. | |

FOREIGN PATENT DOCUMENTS

| | | |
|---|---|---|
| EP | 2226564 A2 | 9/2010 |
| EP | 2316728 A2 | 5/2011 |
| EP | 2713010 A1 | 4/2014 |
| JP | 5214958 A | 8/1993 |
| JP | 2002129903 A | 5/2002 |
| JP | 2009041433 A | 2/2009 |
| JP | 2012002229 A | 1/2012 |

OTHER PUBLICATIONS

Unofficial English Translation of Chinese Office Action issued in connection with corresponding CN Application No. 201511014281.7 dated Dec. 5, 2016.

Unofficial English translation of Office Action issued in connection with corresponding JP Application No. 2015-245800 dated Jan. 17, 2017.

* cited by examiner

ENGINE COMPONENT

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler fluid from the high and/or low pressure compressors to the engine components which require cooling. Temperatures in the high pressure turbine are around 1000° C. to 2000° C. and the cooling fluid from the compressor is around 500° C. to 700° C. While the compressor air is a high temperature, it is cooler relative to the turbine air, and may be used to cool the turbine.

Interior cavities of engine components that receive cooling fluid have been provided with turbulators in order to generate turbulence in the cooling fluid and enhance heat transfer.

BRIEF DESCRIPTION OF THE INVENTION

The invention relates to an engine component for a gas turbine engine generating a hot combustion gas flow.

In one aspect, the invention relates to an engine component having a hot surface in thermal communication with the hot combustion gas flow, a cooling surface, opposite the hot surface, and defining a cooling area having a cross-sectional width along which a cooling fluid flows in a flow direction, and at least one vortex generator extending from the cooling surface and located in the cooling area, and having a body length, a body width, and a body axis. The body length is greater than the body width and extends along the body axis. The body axis is substantially aligned with the flow direction. The body width is less than the cross-sectional width of the cooling area. The vortex generator is shaped to induce a vortex in the cooling fluid in response to contact with the flowing cooling fluid.

In another aspect, the invention relates to an engine component having a cavity at least partially defining a cooling surface along which a cooling fluid flows in a flow direction, the cavity having a length, a cross-sectional width, and a cross-sectional height, wherein the length is greater than the cross-sectional width, a hot surface, opposite the cooling surface, in thermal communication with the hot combustion gas flow, and at least one vortex generator extending from the cooling surface and having a body length, a body width, a body height, and a body axis. The body length is greater than the body width and extends along the body axis. The body axis is substantially aligned with the flow direction. The body length is 5-15% of the length of the cavity. The body width is 10-35% of the cross-sectional width of the cavity. The body height is 20-75% of the cross-sectional height of the cavity.

DESCRIPTION OF EMBODIMENTS OF THE INVENTION

The described embodiments of the present invention are directed to cooling an engine component, particularly in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
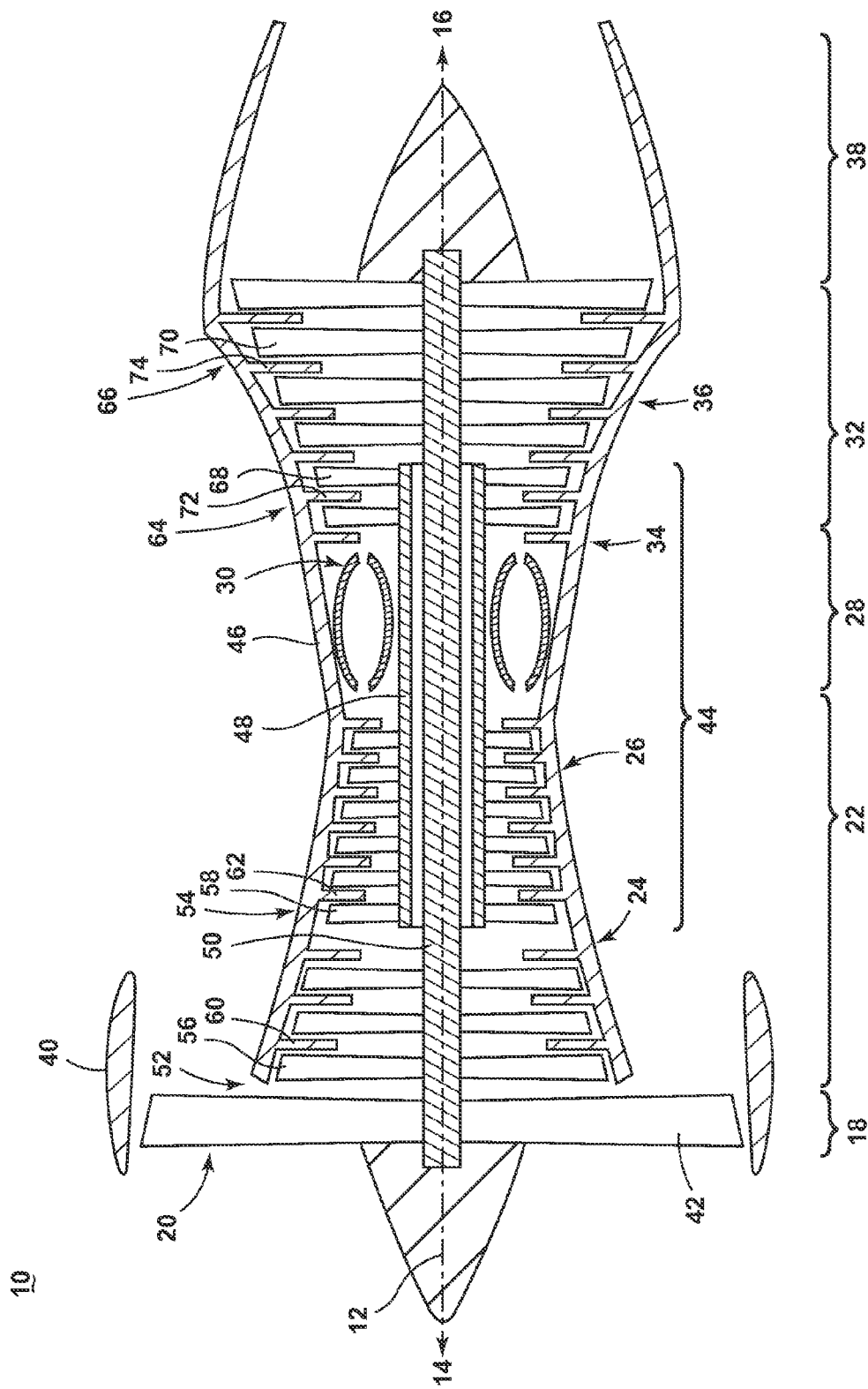
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or tow pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
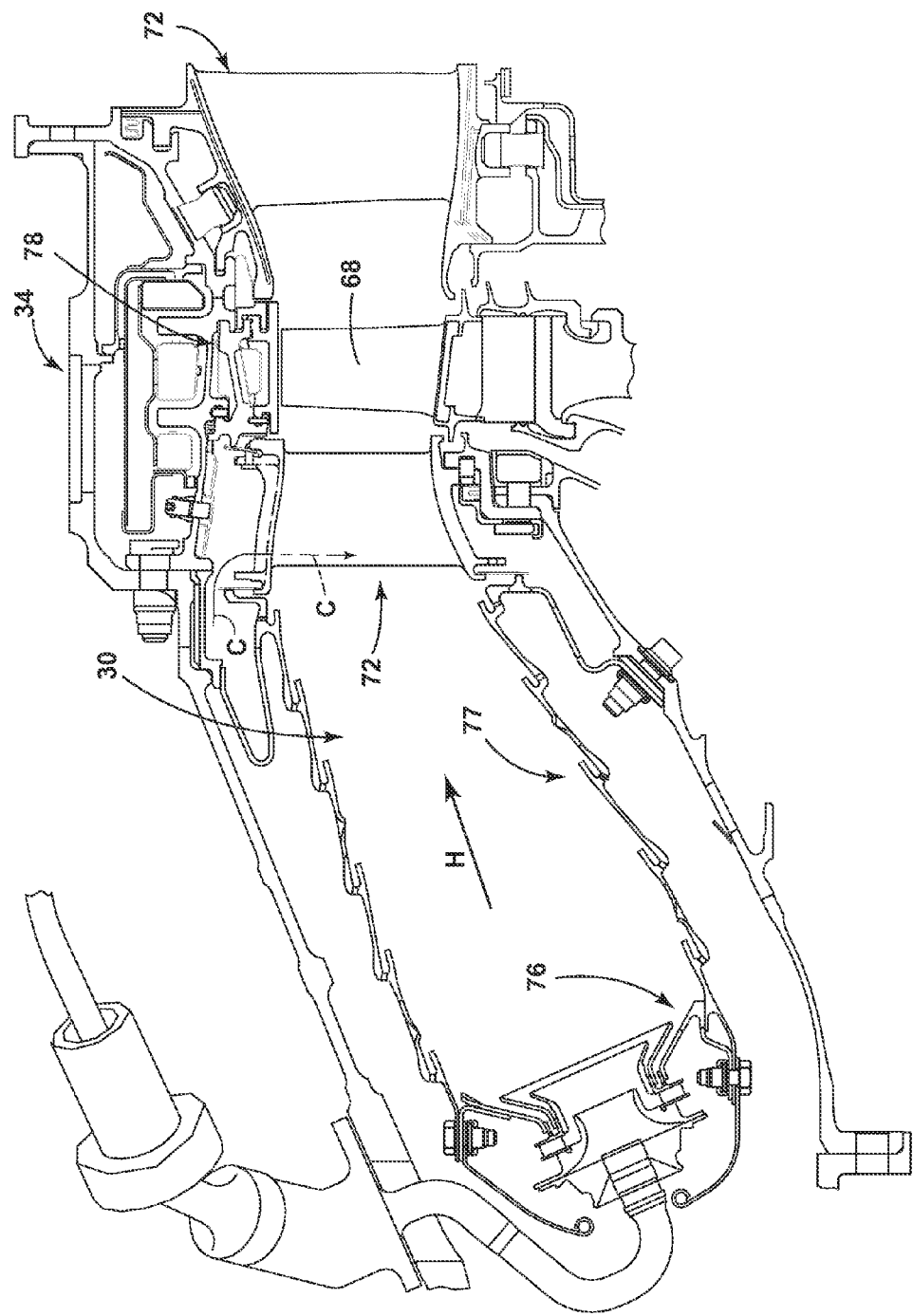
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of static turbine vanes 72, with adjacent vanes 72 forming nozzles therebetween. The nozzles turn combustion gas an that the maximum energy may be extracted by the turbine 34. A cooling fluid flow C passes through the vanes 72 to cool the vanes 72 as hot combustion gas H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a surface in which various cooling embodiments disclosed further herein may be utilized. Some non-limiting examples of the engine component having a cooled surface can include airfoils such as the blades 68, 70, vanes or nozzles 72, 74, the combustor deflector 76, the combustor liner 77, or the shroud assembly 78, described in FIGS. 1-2.

Figure 3:
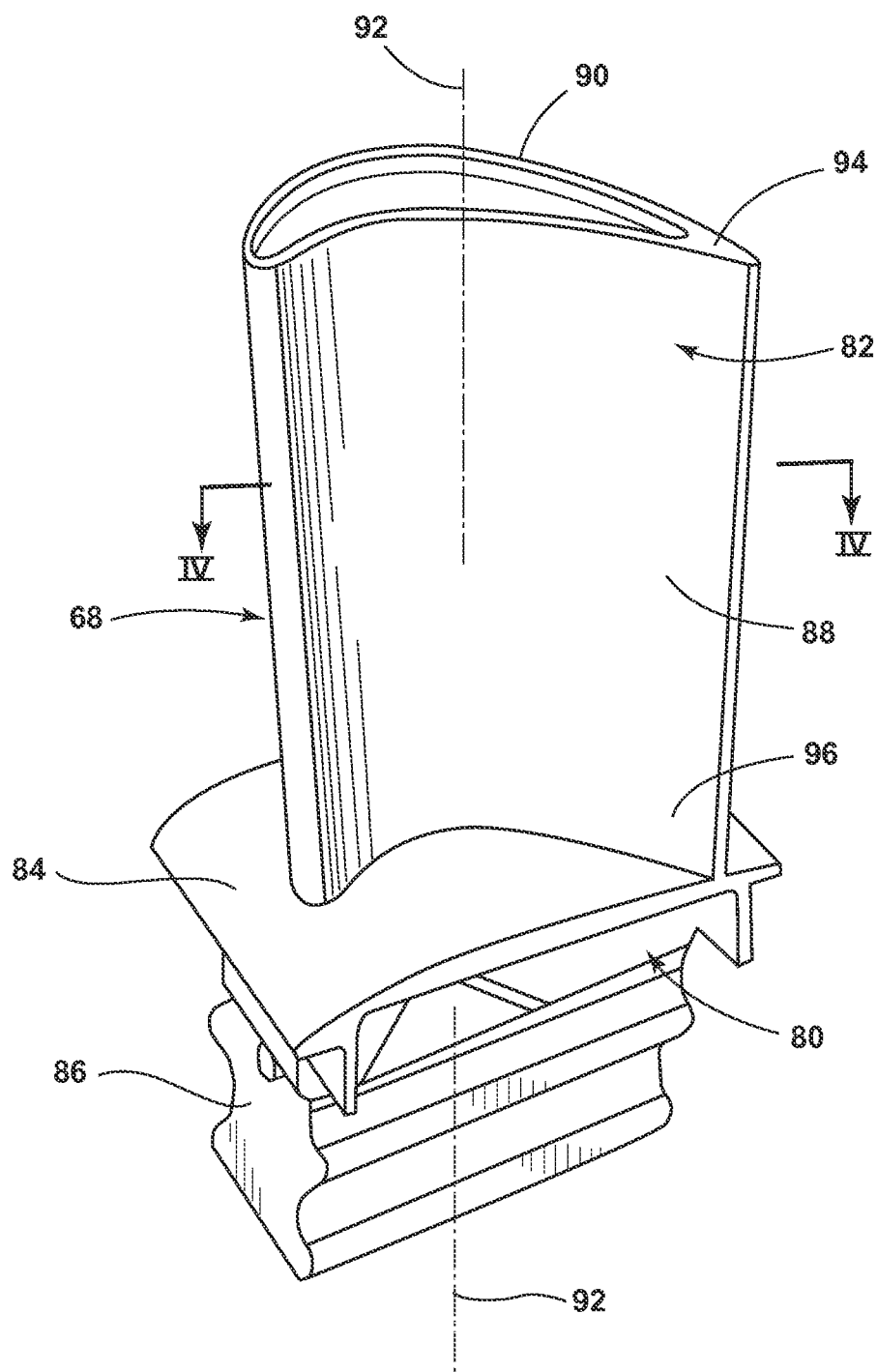
FIG. 3 is perspective view of an engine component in the form of a turbine blade of the engine from FIG. 1.

FIG. 3 is perspective view of an engine component in the form of one of the turbine blades 68 of the engine 10 from FIG. 1. The turbine blade 68 includes a shank 80 and an airfoil blade 82. The shank 80 further includes a blade platform 84, which helps to radially contain the turbine air flow, and a dovetail 86, which attaches to a turbine rotor disk (not shown). The airfoil blade 82 has a concave-shaped pressure side 88 and a convex-shaped suction side 90 which are joined together to define an airfoil shape. A longitudinal axis 92 extends radially outward toward a blade tip 94 and radially inward toward a blade root 96 which is attached to the shank 80. The blade 68 rotates in a direction such that the pressure side 88 follows the suction side 90. Thus, as shown in FIG. 3, the blade 68 would rotate into the page.

Figure 4:
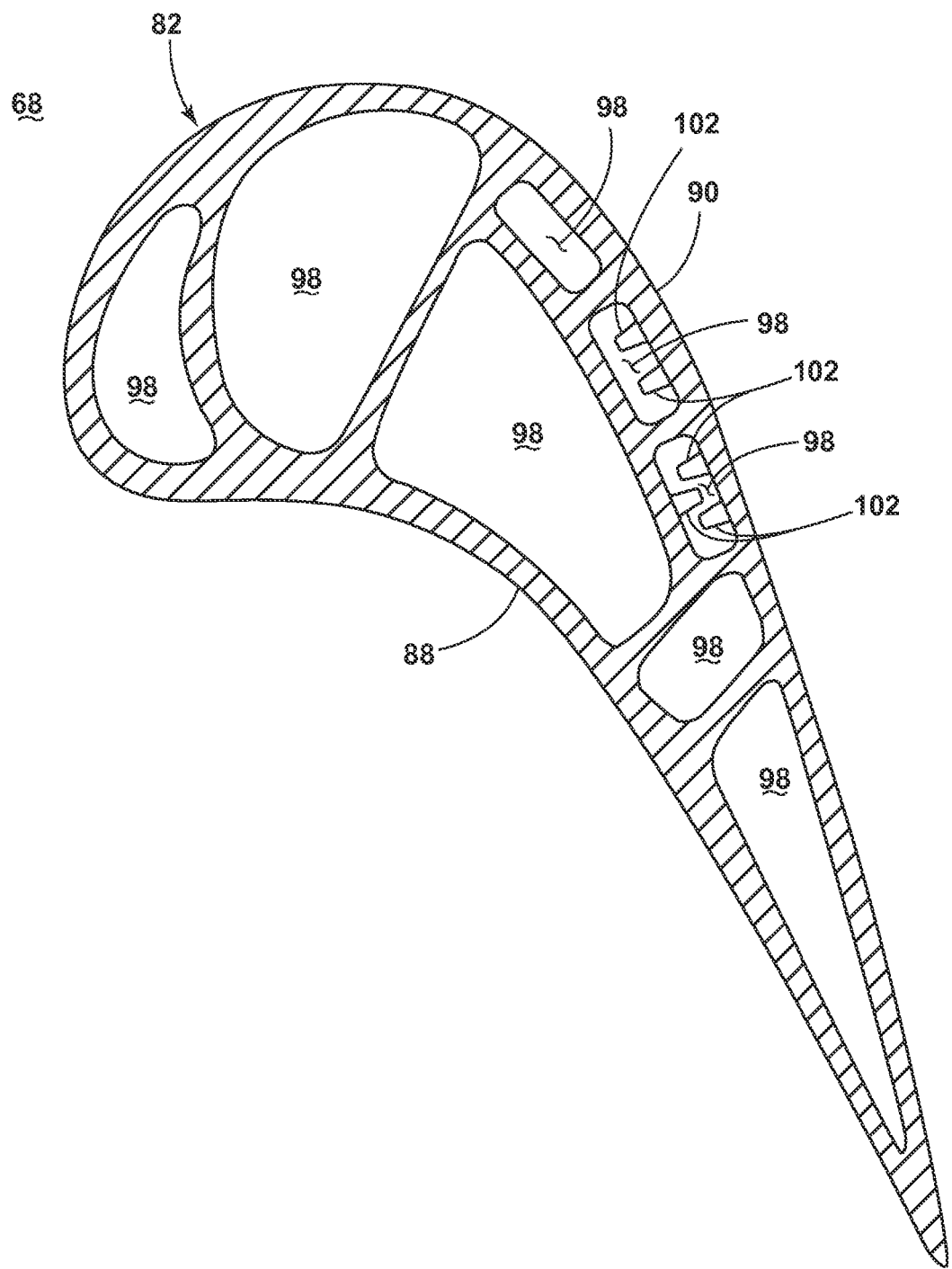
FIG. 4 is a cross-sectional view of the turbine blade taken along line IV-IV of FIG. 3.

FIG. 4 is a cross-sectional view of the airfoil blade 82 of the turbine blade 68, taken along line IV-IV of FIG. 3. The airfoil blade 82 includes a plurality of generally longitudinally extending internal cavities in the form of cooling passages 98 which direct a flow of cooling fluid therethrough. The cooling passages 98 may be interconnected to define at least a portion of a coolant circuit through the blade 68. It will be seen in FIG. 4 that each of cooling passages 98 can have a unique cross-section, ranging from substantially rectangular to nearly trapezoidal, although the cross-section of such cooling passages 98 may have any shape. During operation, the coolant circuit receives cooling fluid from an inlet in the shank 80, and, after coursing through the cooling passages 98, the cooling fluid exits the airfoil blade 82 through film holes.

In accordance with one embodiment of the present invention, at least one vortex generator 102 is provided within at least one of the cooling passages 98. The vortex generator 102 can extend from a cooling surface of the cooling passage 98 to induce a vortex, in cooling fluid flowing through the cooling passage 98. In FIG. 4, only one cooling passage 98 is shown as having a vortex generator 102, although it is understood that more or all of the cooling passages 98 can be provided with vortex generators 102. Further, while vortex generators 102 are shown on the suction side 90 of the airfoil blade 82, it is understood that vortex generators 102 can be provided on an interior wall or the pressure side 88 of the airfoil blade 82.

Figure 5:
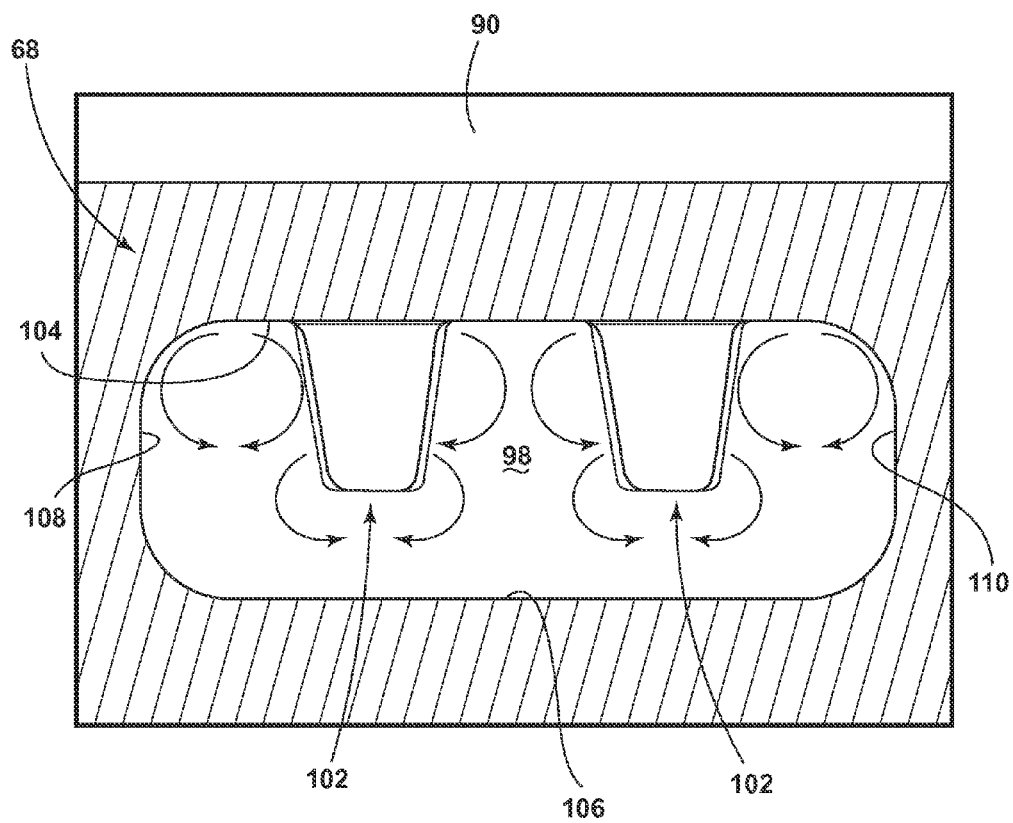
FIG. 5 is a close-up view of a cooling passage of the turbine blade from FIG. 4.

FIG. 5 is a close-up view of one of the cooling passages 98 from FIG. 4. The vortex generator 102 can extend from a cooling surface of the cooling passage 98 to induce a vortex, generally indicated by arrows in FIG. 5, in cooling fluid flowing through the cooling passage 98, in response to contact with the flowing cooling fluid. As noted above, the cooling passage 98 can have various cross-sectional shapes; as shown and described, the present cooling passage 98 is substantially quadrilateral in shape with four side walls 104, 106, 108, 110 defining the cross-sectional shape. In the present example, the first wall 104 may be defined by the suction side 90 of the blade 68, with the suction side 90 defining a hot surface of the blade 68 that is in in thermal communication with a hot combustion gas flow and the interior of the wails 104, 106, 108, 110 defining a cooling surface of the blade 68 that is opposite the hot surface along which the cooling fluid flows. In the case of a gas turbine engine, the hot surface may be exposed to gases having temperatures in the range of 1000° C. to 2000° C., Suitable materials for the walls 104, 106, 108, 110 include, but are not limited to, steel, refractory metals such as titanium, or super alloys based on nickel, cobalt, or iron, and ceramic matrix composites.

The vortex generator 102 is provided on one or more walls 104, 106, 108, 110 of the cooling passage 98. In the illustrated embodiment, the vortex generator 102 is provided on the interior wall 104 that is diametrically opposite the suction side 90, with the interior wall 104 defining a cooling area in which the vortex generator 102 is located. It is understood that the vortex generators 102 could be on combination of the walls 104, 106, 108, 110 of the cooling passage 98 as well.

Figure 6:
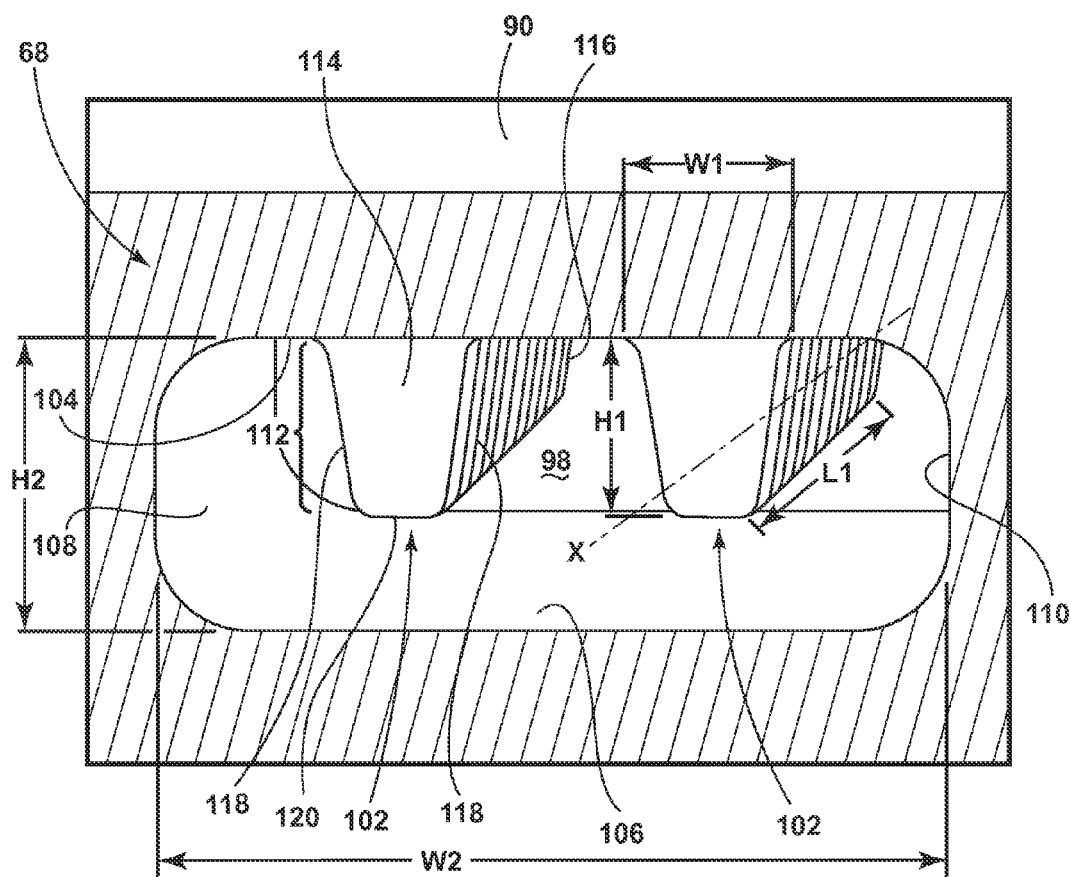
FIG. 6 is a close-up, perspective view of a cooling passage of the turbine blade from FIG. 4.

FIG. 6 is a perspective view of FIG. 5. The vortex generators 102 can have a three-dimensional body 112 having a body length L1, a body width W1, and a body height H1. The body 112 defines a body axis X, and the body length L1 can be measured along the body axis X. The body width W1 can be measured perpendicularly to the body axis X. The body height 141 can be measured from the interior wall 104.

The cooling passage 98 can have a cross-sectional width W2 and a cross-sectional height H2. The cross-sectional width W2 can be measured between the wails 104, 106, while the cross-sectional height H2 can be measured between the walls 108, 110.

The body 112 of the vortex generator 102 can vary in contour. As illustrated, the body 112 has a leading surface 114, a trailing surface 116, and opposing side surfaces 118 joining the leading and trailing surfaces 114, 116. The side surfaces 118 can further be joined by a top surface 120. In the illustrated embodiment, the body 112 is contoured such that the side surfaces 118 taper toward each other toward the top surface 120. The side surfaces 118 can be substantially identical such that the body 112 is symmetrical when viewed down the body axis X, or can differ, such that the body 112 is asymmetrical when viewed down the body axis X. Also, the leading and trailing surfaces 114, 116 can be substantially identical such that the body 112 is symmetrical along the body axis X, or can differ, such that the body 112 is asymmetrical along the body axis X.

For the illustrated body 112, the body length L1 is defined by the distance between the leading and trailing surfaces 114, 116, the body width W1 is defined by the distance between the side surfaces 118, and the body height H1 is defined as the distance from the interior wall 104 to the top surface 120. More specifically, the body length L1 can be the maximum distance between the leading and trailing surfaces 114, 116, the body width W1 can be the maximum distance between the side surfaces 118, and the body height H1 can be the maximum distance from the interior wall 104 to the top surface 120.

It is noted that the cooling passage 98 can include multiple vortex generators 102; in the illustrated embodiment, two side-by side vortex generators 102 are shown. In embodiments where multiple vortex generators 102 are provided in a cooling passage 98, the vortex generators 102 can each have a substantially constant body height H1 so that they extend into the cooling passage 98 a substantially constant amount. Also, such vortex generators 102 have a substantially constant body length L1, body width W1, orientation, and/or body contour. Alternatively, the vortex generators 102 may differ from each other in one or more of these respects.

Figure 7:
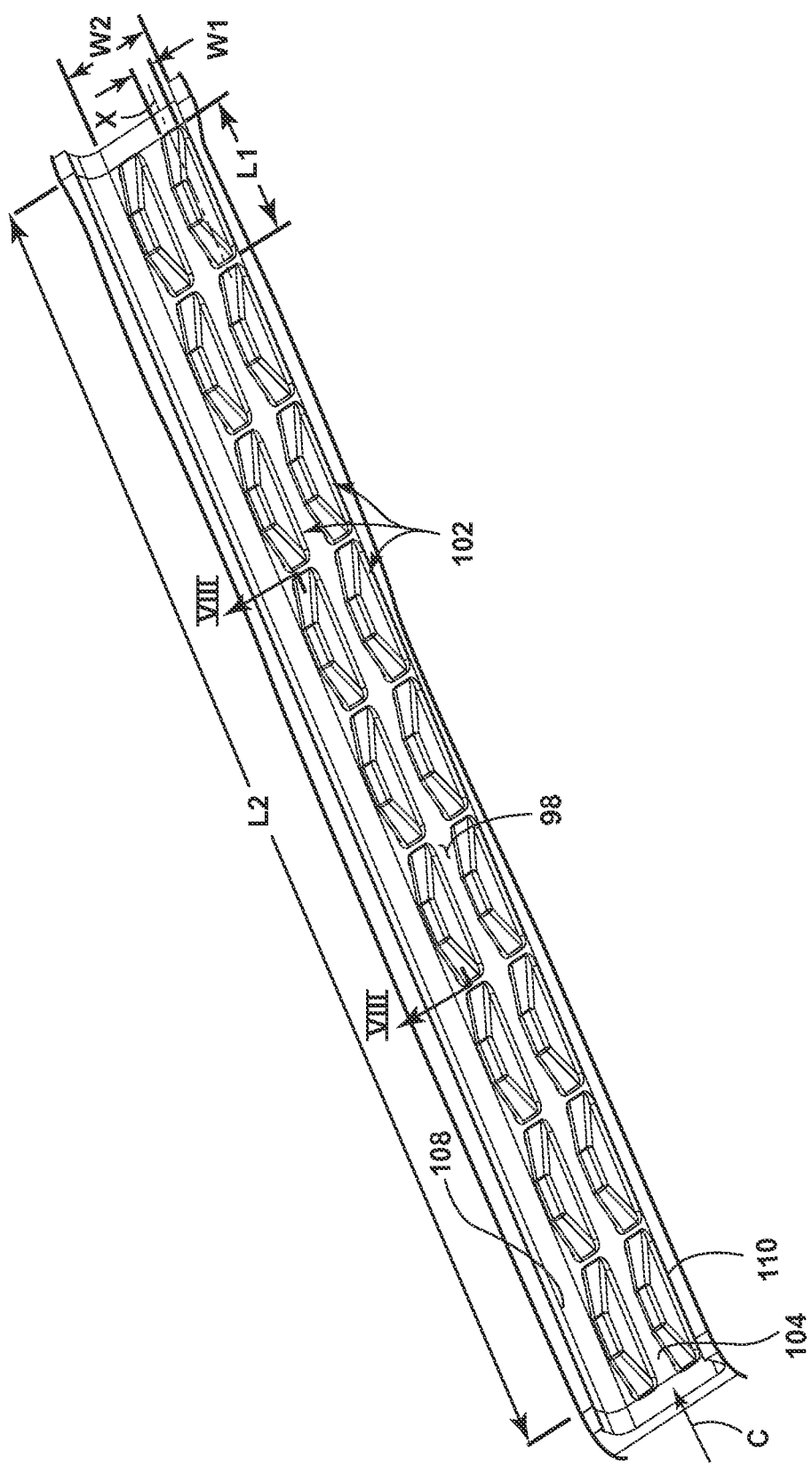
FIG. 7 is a perspective view of a portion of the interior of the cooling passage from FIG. 6, with a wall of the cooling passage removed for clarity to show vortex generators.

FIG. 7 is a perspective view of a portion of the interior of the cooling passage 98 with a wall 106 defining the cooling passage 98 removed for clarity. The cooling passage 98 can include multiple vortex generators 102 located within the cooling area defined by the passage 98 and arranged along the length of the passage 98. The cooling passage 98 further has a passage length L2. The passage length L2 can be measured in the flow direction of the cooling fluid through the cooling passage 98, generally indicated by arrow C. In the present embodiment, the cooling passage 98 is elongated, such that the passage length L2 is greater than the cross-sectional width W2, as well as the cross-sectional height H2 (see FIG. 6); it is noted that the full height H2 of the cooling passage 98 is not shown in FIG. 7.

With reference to FIGS. 5 and 6, the shape of the vortex generator 102, including the orientation and dimensions of the vortex generator 102 relative to the cooling passage 98, impacts the performance of the vortex generator 102 in inducing vortices in the cooling fluid. For example, the vortex generator 102 can further be elongated in the flow direction C, such that the body length L1 is greater than the body width W1. Still further, the vortex generator 102 does not span the cooling area, such that the body width W1 of the vortex generator 102 is less than the cross-sectional width W2 of the cooling passage 98. Likewise, the body height H1 of the vortex generator 102 is less than the cross-sectional height H2 of the cooling passage 98.

In one more specific embodiment, the vortex generator 102 can have a body height H1 that is 20-75% of the cross-sectional height H2 of the cooling passage 98, a body length L1 that is 5-15% of the length of the cooling passage 98, a body width W1 that is 10-35% of the cross-sectional width W2 of the cooling passage 98, or any combination of these dimensions. A vortex generator within these ranges can generate sufficient vortices in the cooling flow to augment heat transfer, white avoiding high pressure losses and locally high Mach numbers. It is noted that these dimensions are representative of an aircraft engine turbine blade, and that the dimensions may vary in other applications of the vortex generators.

Figure 8:
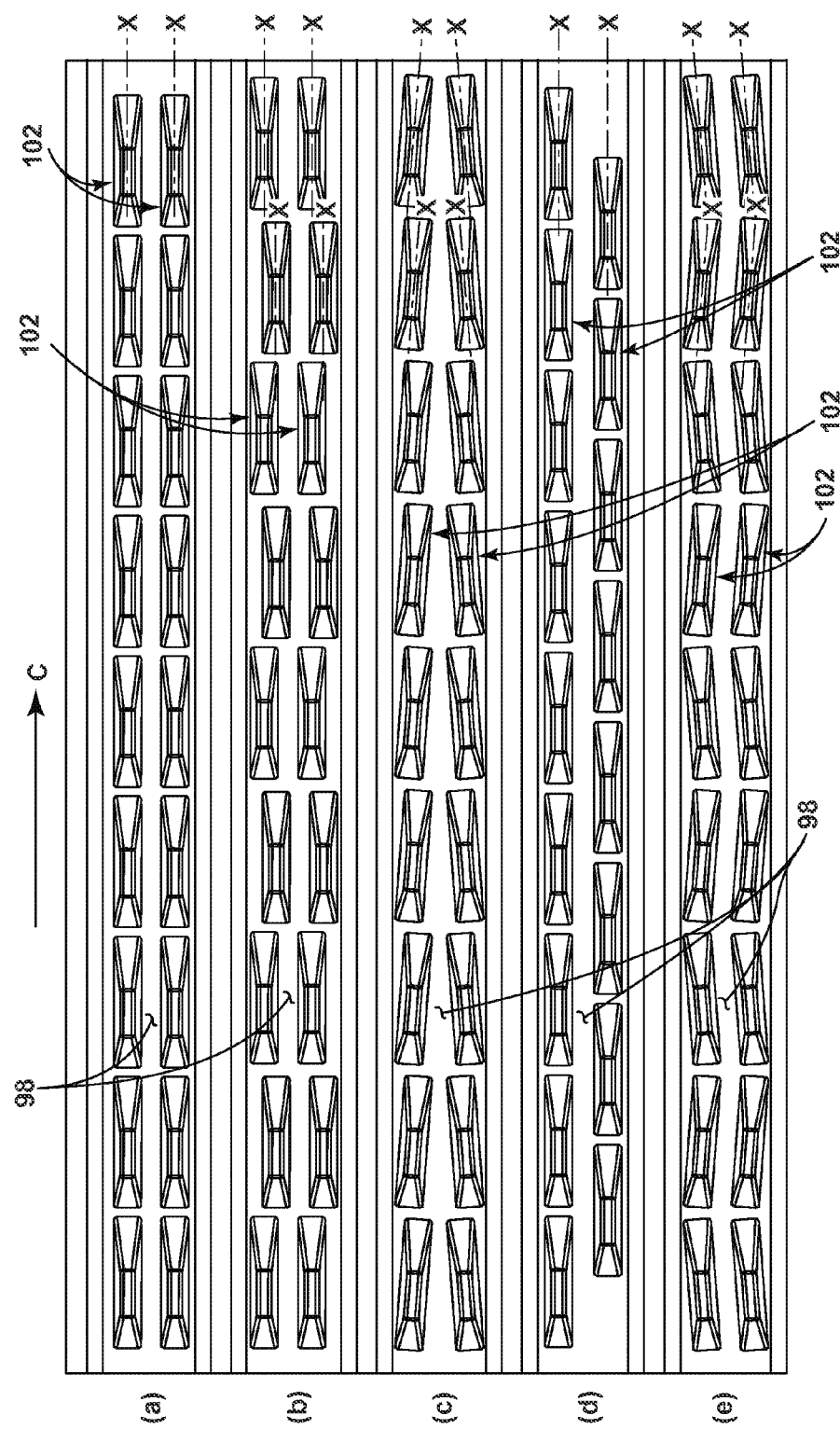
FIG. 8 is a top view showing some exemplary orientations for the vortex generators within the cooling passage of FIG. 7.

FIG. 8 is a top view showing some exemplary orientations for the vortex generator 102 within the cooling passage 98. In each illustrated example, the vortex generators 102 are arranged in two rows that extend in substantially the same direction as the flow direction C, with each row having multiple vortex generators 102. However, in other examples, the cooling passage 98 can be provided with greater or fewer rows of vortex generators 102.

In the first illustrated example (a), which is the same as shown in FIGS. 5 and 6, the vortex generators 102 can be oriented substantially in line with the flow direction C, such that body axis X can be substantially aligned with the flow direction C. By "substantially aligned," the body axis X can be offset by 15 degrees or less from the flow direction C. More specifically, in example (a) the body axis X is parallel to the flow direction C; in other words, the body axis X is offset by 0 degrees from the flow direction C. As such, the vortex generators 102 in a single row lie along collinear body axes X. Further, vortex generators 102 in different rows are aligned with each other.

In the second illustrated example (b), the body axis X of each vortex generator 102 is parallel to the flow direction C, but are staggered along the flow direction C such that alternating vortex generators 102 in a single row lie along parallel, but not collinear, body axes X. As such, the rows are staggered relative to each other in a direction substantially perpendicular to the flow direction C. Vortex generators 102 in different rows are aligned with each other.

In the third illustrated example (c), the body axis X of each vortex generator 102 is offset by approximately 10 degrees from the flow direction C. As such, each vortex generator 102 in a single row lie along parallel, but not collinear, body axes X. Further, the vortex generators 102 in different rows are aligned with each other; however, the body axis X of the vortex generator 102 in one row is non-parallel to the body axis X of the aligned vortex generator 102 in the other row.

In the fourth illustrated example (d), the body axis X of each vortex generator 102 is parallel to the flow direction C and the vortex generators 102 are aligned along the flow direction C along collinear body axes X, but vortex generators 102 in different rows are staggered along the flow direction C such that the rows are offset from each other.

Figure 9:
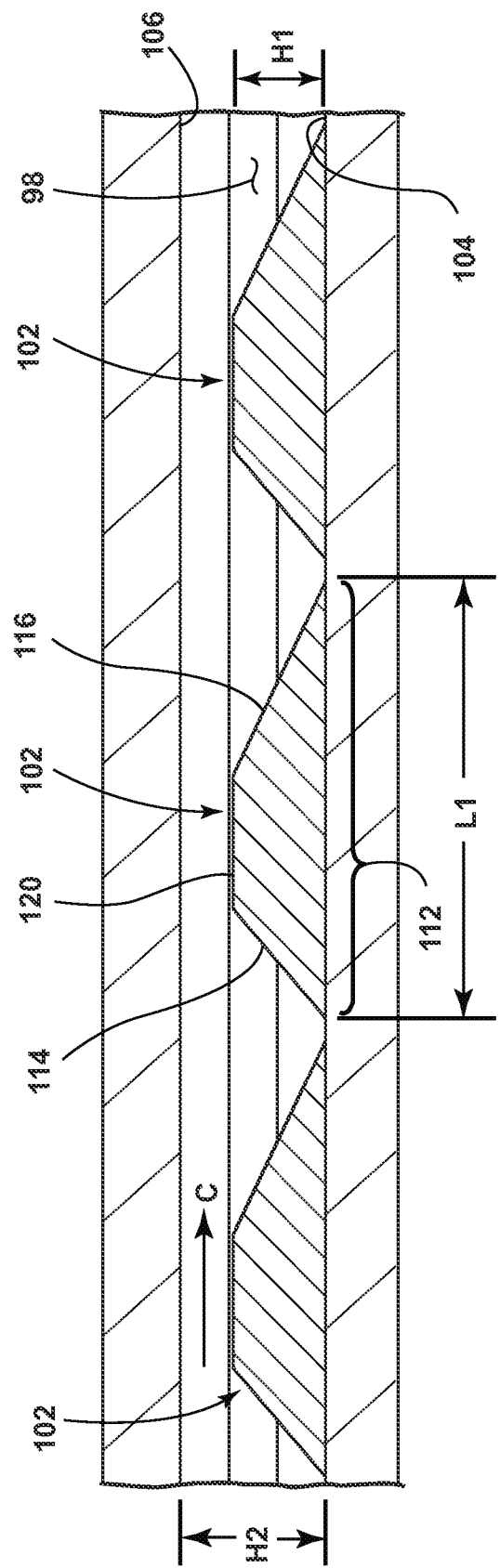
FIG. 9 is a cross-sectional view taken along line VIII-VIII of FIG. 7.

FIG. 9 is a cross-sectional view of the vortex generators 102 taken along line VIII-VIII of FIG. 7. The leading surface 114 faces upstream relative to the flow direction C and the trailing surface 1116 faces downstream relative to the flow direction C. The leading and trailing surfaces 114, 116 extend from the wall 104 at an angle to converge with the top surface 120. In the illustrated embodiment, the body 112 has an airfoil shape and is contoured such that the angle defined by the leading surface 114 is steeper than the angle defined by the trailing surface 116.

Figure 10:
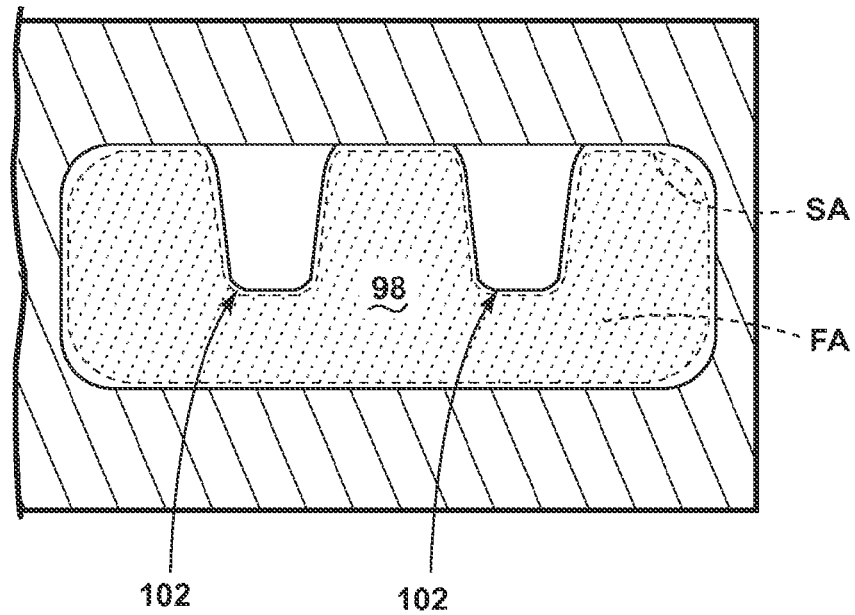
FIGS. 10-11 show a comparison of cooling passages provided with the vortex generators of FIG. 7 and with conventional turbulators.
Figure 11:
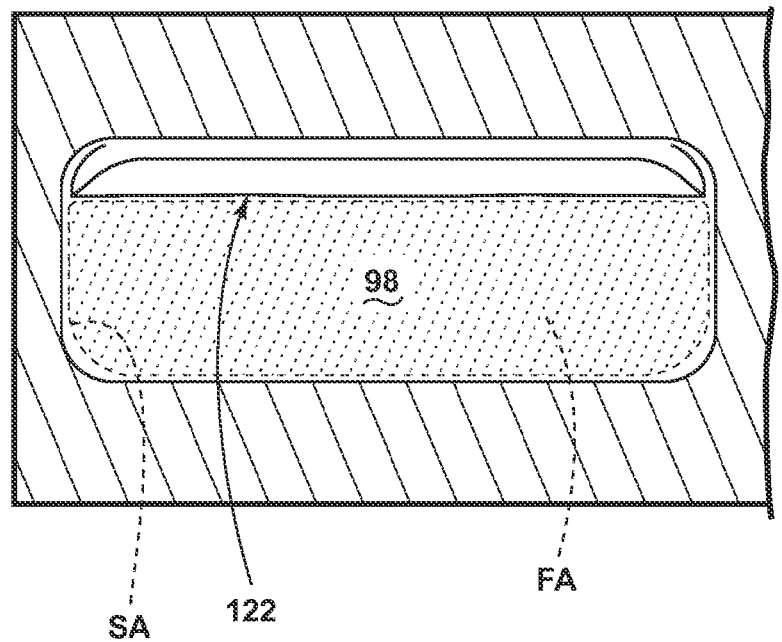

In the art of cooling engine components, prior art patents have conflated the terms vortex generators and turbulators, even when it was incorrect to do so. For purposes of this disclosure, it is important to clarify the difference between vortex generators and turburlators and to properly define a vortex generator because this disclosure is directed to vortex generators, not to turbulators. FIGS. 10-11 show a comparison of a cooling passage 98 provided with the vortex generators 102 to a cooling passage 98 provided with conventional turbulators 122, respectively. The turbulators 122 are typically rectangular in shape, are oriented across the cooling passage 98, and are spaced apart in the direction of cooling fluid flow. In the present embodiment, the turbulators 122 are perpendicular to the flow direction, but may also be at an angle to the flow direction, such as 45 degrees. The vortex generators 102 can increase the internal heat transfer surface area SA in comparison to the turbulators 122/ The heat transfer surface area SA can be defined as the surface area of the cooling surface in the cooling passage 98; in the present embodiment, the heat transfer surface area SA is the combined surface area of the walls 104, 106, 108, 110 and the surface area of the vortex generators or turbulators 122. For illustration purposes, each passage 98 is shown in FIGS. 10-11 with a dotted line generally indicating the heat transfer surface area SA, although it is understood that the cross-section does not show the entire heat transfer surface area SA of the passages 98. The larger heat transfer surface area SA provided by the vortex generators 102 produces a higher heat transfer performance than the turbulators 122.

The cooling passages 98 further define a flow area where the flow area FA is the open cross-sectional arear of the cooling passage 98 through which cooling fluid can flow. For illustration purposes, each passage 98 is shown in FIGS. 10-11 with a dotted pattern generally indicating the flow area FA. In the example illustrated herein, the cooling passage 98 containing the vortex generators 102 has the same flow area FA as the cooling passage 98 containing the turbulators 122, however, the heat transfer surface area SA for the cooling passage 98 with the vortex generators 102 can be 40-60% greater than that for the turbulators 122 because the axial orientation of the vortex generators 102 allows greater penetration of the vortex generators 102 into the cooling fluid flow. The turbulators 122 cannot be configured to match the penetration of the vortex generators 102, because this would impact the flow area FA.

The turbulators 122 increase the heat transfer coefficients within the cooling passage 98 primarily by maintaining the turbulence of the cooling air as it flows over each of the turbulators 122. As the turbulators 122 are generally transverse to the flow direction, particles in the cooling flow tend to collect in recirculating flow regions just upstream and downstream of the turbulators 122. The vortex generators 102, in contrast to the turbulators 122, tend to increase the heat transfer coefficients by generating vortices that extend downstream with the cooling flow. Particles entrained in the cooling flow tend to follow the streamlines of the vortices and do not accumulate as they do with turbulators. Further, the vortex generators 102 are not generally transverse to the cooling air flow, which further lessens the likelihood any entrained particles accumulating in specific regions. Finally, the vortex generators 102 tend to have a more aerodynamic shape with the body axis being generally parallel to the cooling air flow.

Figure 12:
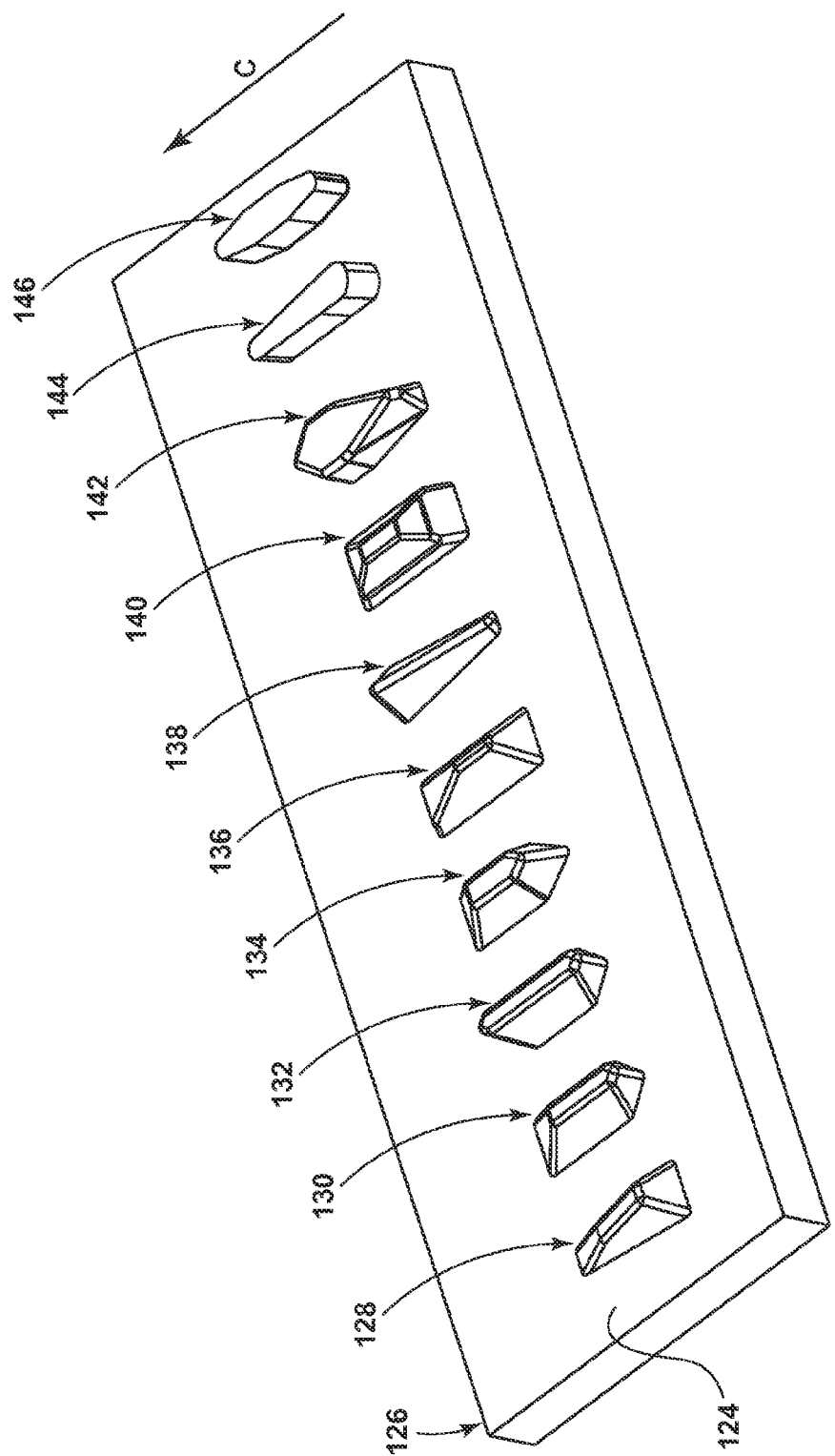
FIG. 12 is a perspective view showing further embodiments of vortex generators.

The body contour of the vortex generator can also impact the performance of the vortex generator. Some non-limiting examples of different body contours for vortex generators according to further embodiments of the invention are shown in FIG. 12. The body contour of a vortex generator can be defined by its cross-sectional shape and/or its planform. The cross-sectional shape can be viewed in a plane orthogonal to the body axis X of the vortex generator. The planform is the contour of the vortex generator as viewed from above a cooling surface 124 of an engine component 126 from which the vortex generators projects. It is understood that the dimensions and orientations of the vortex generators shown in FIG. 12 may conform with those discussed above with reference to FIGS. 5-9, or may differ. Further, as discussed above with respect to FIG. 2, the engine component can comprise one of an airfoil, a nozzle, a vane, a blade, a shroud, a combustor liner, or a combustor deflector.

Some non-limiting examples of cross-sectional shapes include rectangular, triangular, and trapezoidal, and may be at least partially defined by the shape of the leading and trailing surfaces of the vortex generator. Some non-limiting examples of shapes for the leading the trailing surfaces include ramped, wedged, or rounded. For example, the leading surfaces of vortex generators 128, 136, 140, 142 are ramped; those of vortex generators 130, 132, 134, 138 are wedged; and those of vortex generators 144, 148 are rounded. The trailing surfaces of vortex generators 118, 130, 134, 136, 138, 140 are ramped; those of vortex generators 132, 142 are wedged; and those of vortex generators 144, 148 are rounded. The ramped, wedged, or rounded surfaces help maintain a high cooling fluid velocity along the cooling surface 124 which can reduce the tendency for dust to accumulate on the cooling surface 124.

Some non-limiting examples of planforms include rectangular, trapezoidal, diamond-shaped, kite-shaped, teardrop-shaped, ovoid, elliptical, pentagonal, hexagonal, and heptagonal. For example, the vortex generator 128 has a generally trapezoidal planform, the vortex generators 130, 134 have a generally pentagonal planform, the vortex generator 132 has a generally hexagonal planform, the vortex generators 136, 142 have a generally heptagonal planform, the vortex generator 138 has a generally kite-shaped planform, the vortex generator 140 has a generally rectangular planform, the vortex generator 144 has a generally teardrop-shaped planform, and the vortex generator 146 has a generally elliptical planform.

In one embodiment, the vortex generator 138 having a generally kite-shaped planform with a wedged leading surface and a ramped trailing surface allows for smatter vortices to initiate at the leading surface and grow along the diverging and expanding side walls that intersect the cooling surface 124. The kite-shaped planform presents a small initial disturbance to the cooling fluid flow that grows naturally as a vortex on both side walls.

In any of the above embodiments, it is understood that while the drawings may show the vortex generators having sharp corners, edges, and/or transitions with the cooling surface for purposes of illustration, is may be more practical for the corners, edges, and/or transitions to be smoothly radiused or filleted. Furthermore, embodiments of the vortex generators illustrated as having smoothly radiused or filleted corners, edges, and/or transitions with the cooling surface may instead have sharp corners, edges, and/or transitions.

In any of the above embodiments, while the vortex generators are primarily shown on one surface defining the cooling area, the location of the vortex generators is not so limited. The vortex generators may be located on multiple surfaces defining the cooling area. For example, they may be located on opposing surfaces, adjacent surfaces, or all of the surfaces for that matter. The vortex generators may also be located on a surface extending into or from the surfaces defining the cooling area. The vortex generators are not limited to being located on the surfaces defining the cooling area. Some of the vortex generators may be both in an area not defining the cooling area and in the cooling area, for example.

The various embodiments of systems, methods, and other devices related to the invention disclosed herein provide improved cooling for turbine engine components. One advantage that may be realized in the practice of some embodiments of the described systems is that vortex generators are provided for the walls and/or interior cavities of engine components in order to improve the cooling of the engine component. The vortex generators induce strong vortices in the cooling fluid flow, which in turn produces high internal heat transfer coefficient augmentation, in addition to providing a large internal heat transfer area. This effectiveness can increase the time-on-wing (TOW) for the turbine engine and the service life of these parts can be increased.

In a further advantage of the invention, the vortex generators can be used instead of conventional turbulators, and can produce internal heat transfer coefficients comparable to conventional turbulators, but with much higher coolant-side area enhancement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine generating a hot combustion gas flow, comprising:
    a hot surface in thermal communication with the hot combustion gas flow;
    a cooling surface, opposite the hot surface, and defining a cooling area having a cross-sectional width along which a cooling fluid flows in a flow direction; and
    at least one vortex generator extending from the cooling surface and located in the cooling area, and having a body length, a body width, and a body axis, wherein:
        the body length is greater than the body width and extends along the body axis;
        the body axis is substantially aligned with the flow direction; and
        the body width is less than the cross-sectional width of the cooling area;
        wherein the vortex generator is shaped to induce a vortex in the cooling fluid in response to contact with the flowing cooling fluid;
        wherein the at least one vortex generator comprises multiple vortex generators located in the cooling area;
        wherein the multiple vortex generators are arranged in multiple rows extending in substantially the same direction as the flow direction, with each row having at least one vortex generators; and
        wherein the body axis of at least one vortex generator in one row is non-parallel to the body axis of at least one vortex generator in another row.

2. The engine component of claim 1, and further comprising an interior cavity at least partially defined by the cooling area, wherein the at least one vortex generator is located within the interior cavity.

3. The engine component of claim 2 wherein the interior cavity has a cross-sectional height and the at least one vortex generator has body height that is 20-75% of the cross-sectional height.

4. The engine component of claim 2 wherein the interior cavity has a length greater than the cross-sectional width.

5. The engine component of claim 4 wherein the body length of the at least one vortex generator is 5-15% of the length of the interior cavity.

6. The engine component of claim 1 where in body width is 10-35% of the cross-sectional width.

7. The engine component of claim 1 wherein the at least one vortex generator comprises a leading surface facing upstream relative to the flow direction, a trailing surface facing downstream relative to the flow direction, and opposing side surfaces joining the leading and trailing surfaces, wherein the body length is defined by the distance between the leading and trailing surfaces, and the body width is defined by the distance between the side surfaces.

8. The engine component of claim 1 and further comprising an interior cavity at least partially defined by the cooling area, wherein the multiple rows are located within the interior cavity.

9. The engine component of claim 1 wherein one row is staggered relative to another row, in the flow direction.

10. The engine component of claim 1 wherein each row comprises multiple vortex generators.

11. The engine component of claim 10 wherein the vortex generators of at least one of the multiple rows are staggered relative to each other in a direction substantially perpendicular to the flow direction.

12. The engine component of claim 1 wherein the body axis forms an angle with the cooling fluid flow of 15 degrees or less.

* * * * *